(12) United States Patent
Minnick

(10) Patent No.: US 6,598,835 B2
(45) Date of Patent: Jul. 29, 2003

(54) METAL STUD INSULATING PIPE CLAMPS

(75) Inventor: Michael W. Minnick, North Ridgeville, OH (US)

(73) Assignee: Oatey Co., Cleveland, OH (US)

( * ) Notice: Subject to any disclaimer, the term of this patent is extended or adjusted under 35 U.S.C. 154(b) by 0 days.

(21) Appl. No.: 09/785,852

(22) Filed: Feb. 16, 2001

(65) Prior Publication Data

US 2002/0113172 A1 Aug. 22, 2002

(51) Int. Cl.[7] .................................................. F16L 5/00
(52) U.S. Cl. ........................ 248/56; 248/57; 248/68.1; 285/921
(58) Field of Search .............................. 248/65, 49, 56, 248/57, 74.2, 27.1, 27.3; 138/108, 112; 174/153 G; 220/3.2, 3.3, 3.4, 3.5, 3.6; 277/606, 607, 608, 609, 616; 285/48, 149.1, 152.1, 921

(56) References Cited

U.S. PATENT DOCUMENTS

| | | | |
|---|---|---|---|
| 2,922,836 A | * | 1/1960 | Brown .................... 174/153 G |
| 4,192,477 A | | 3/1980 | Decky et al. |
| 4,930,733 A | | 6/1990 | Logsdon |
| 5,537,714 A | * | 7/1996 | Lynch et al. .................. 16/2.1 |
| 5,702,076 A | | 12/1997 | Humber |

* cited by examiner

Primary Examiner—Ramon O. Ramirez
Assistant Examiner—Jon Szumny
(74) Attorney, Agent, or Firm—Renner, Otto, Boisselle & Sklar, LLP

(57) ABSTRACT

An insulating pipe clamp for supporting one or more pipes within an aperture in a metal wall stud and the like includes an annular body portion having a radially outwardly protruding flange at one end. Extending axially through the body portion are a plurality of different diameter holes for accommodating different size pipes. The axes of the holes are offset from the axis of the body portion to permit rotation of the clamp to compensate for any misalignment between a pipe extending through one or more of the holes and a respective aperture in a metal wall stud in which the clamp is inserted. On the rearwardly facing end wall of the flange are a plurality of tabs for grasping by an installer for ease of insertion of the clamp into a respective aperture in a metal wall stud and for ease of rotation of the clamp within the aperture.

18 Claims, 1 Drawing Sheet

METAL STUD INSULATING PIPE CLAMPS

FIELD OF THE INVENTION

This invention relates generally to insulating pipe clamps for supporting conduits such as pipes or tubes (hereafter collectively pipes) within apertures in metal wall studs and the like.

BACKGROUND OF THE INVENTION

Insulating pipe clamps used to mount pipes within apertures in metal wall studs are generally known. Such clamps protect the pipes from sharp edges of the metal studs and also eliminate pipe hammering and electrolysis by completely isolating the pipes from the metal studs. Also, the axis of the hole in the pipe clamps which receives the pipe is typically offset from the axis of the clamp body to compensate for any misalignment between the pipe and the aperture in the metal stud through which the pipe extends by rotating the clamp about its axis.

One of the drawbacks of previous insulating pipe clamps is that once the clamps are installed, they are very difficult to adjust (i.e., rotate) within their respective wall stud apertures. Also, such clamps can only accommodate one size of pipe.

SUMMARY OF THE INVENTION

In accordance with one aspect of the present invention, a metal stud insulating pipe clamp is provided that allows for easy rotation of the pipe clamp after installation to alter the orientation of the pipe within the aperture in the metal stud in which the clamp is mounted. To that end, the clamp has one or more tabs at one end which may easily be grasped by the installer to facilitate rotation of one or more clamps within a bay of metal stud apertures through which the pipe runs to compensate for any misaligned holes which could cause stress on the pipe through unnecessary bends.

In accordance with another aspect of the invention, the pipe clamps of the present invention may accommodate more than one size of pipe by providing the clamps with different diameter holes for holding different diameter pipes simultaneously. Also, the axes of the holes are desirably offset from the axis of the body portion of the clamps to permit rotation of the clamps to compensate for any misalignment between the pipe in one of the holes and the aperture in the metal stud through which the pipe extends by rotating the clamps about their axes.

To the accomplishment of the foregoing and related ends, the invention, then, comprises the features hereinafter more fully described and particularly pointed out in the claims, the following description and the annexed drawings setting forth in detail certain illustrative embodiments of the invention, these being indicative, however, of but several of the various ways in which the principles of the invention may be employed.

DETAILED DESCRIPTION OF THE INVENTION

Figure 1:
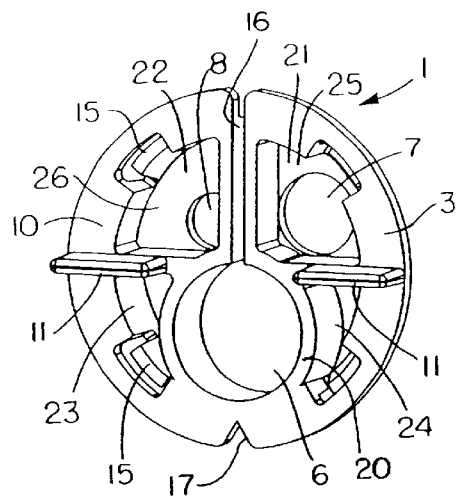
FIG. 1 is a perspective view of one form of insulating pipe clamp in accordance with the present invention as seen from the back end thereof.
Figure 2:
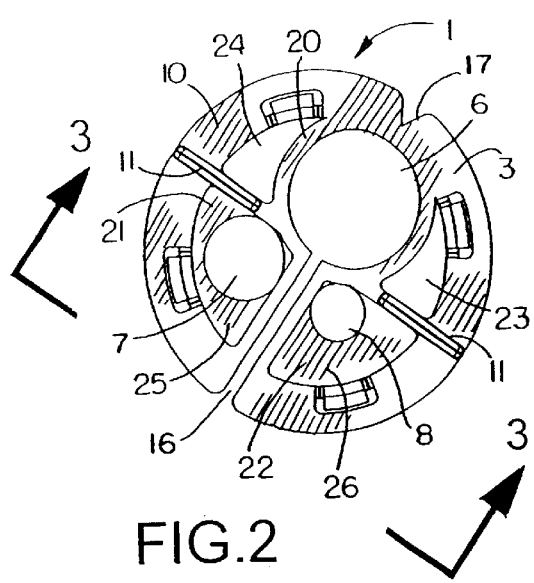
FIG. 2 is a plan view of the back side of the pipe clamp of FIG. 1.

One form of metal stud insulating pipe clamp 1 according to the present invention is shown in FIGS. 1–5, and comprises a substantially annular body portion 2 having a radially outwardly protruding flange 3 at the back end 4. The flange 3 acts as a stop limiting the extent of insertion of the front end 5 of the body portion 2 into an aperture in a metal wall stud or the like for supporting a pipe within one or more holes extending axially through the body portion of the pipe clamp as described hereafter. The outer diameter of the body portion 2 adjacent the flange 3 substantially corresponds to the diameter of the aperture in the metal wall stud for close sliding receipt of the body portion within such aperture. However, the exterior surface of the body portion desirably tapers axially inwardly away from the flange 3 for ease of insertion of the front end 5 of the body portion into the respective aperture in a metal wall stud.

Extending axially through the pipe clamp 1 are a plurality of holes for holding different diameter pipes simultaneously. For example, the pipe clamp 1 shown in FIGS. 1–5 has three holes 6, 7 and 8 of different diameters for holding ½ inch, ⅜ inch, and ¼ inch pipes simultaneously. The pipe clamp 1' shown in FIG. 6 is substantially the same as that shown in FIGS. 1–5 except that the pipe clamp 1' has a ¾ inch hole 6' therethrough for holding a ¾ inch pipe. Also, clamp 1' may have one or two additional holes 7' and 8' (shown in phantom lines in FIG. 6) each having a diameter for example of ¼ inch for holding one or two ¼ inch pipes simultaneously.

While three holes are shown in both clamps 1 and 1', it will be appreciated that one or more holes of different diameters may be provided in each pipe clamp depending on the particular requirements. The larger diameter hole 6, 6' will typically accommodate rigid conduits such as larger water pipes, whereas the smaller diameter holes 7, 7' and 8, 8' will typically accommodate more flexible conduits such as ice maker water lines and/or discharge lines such as water softener or humidifier lines that also run through the wall studs.

The axes of each of the holes through the pipe clamps 1, 1' are offset from the axis of the body portion 2, 2' of the clamps to permit rotation of the clamps to compensate for one or more misaligned holes that could cause stress on the pipes through unnecessary bends. Similarly, one or more clamps that support a pipe that runs through a bay of studs may be rotated to compensate for any misaligned holes through the stud bay that could cause stress on the pipes through unnecessary bends. Otherwise, except for the size and possibly the number of holes in the pipe clamps, the pipe clamp 1' shown in FIG. 6 is substantially the same as that shown in FIGS. 1–5. Accordingly, only the pipe clamp 1 shown in FIGS. 1–5 will be described in detail.

Protruding axially outwardly from the rearwardly facing end wall 10 of the pipe clamp flange 3 are two or more circumferentially spaced tabs 11 that are easily gripped by the installer for ease of insertion of such pipe clamps 1 into respective apertures in metal wall studs. Also, the tabs 11

(and tabs 11', FIG. 6) facilitate rotation of the pipe clamps 1, 1' after the pipe clamps have been installed in the respective apertures in the metal wall studs to compensate for any misalignment between a pipe extending through one or more of the offset holes and the respective apertures in the metal wall studs which the pipe clamps are mounted.

Figure 3:
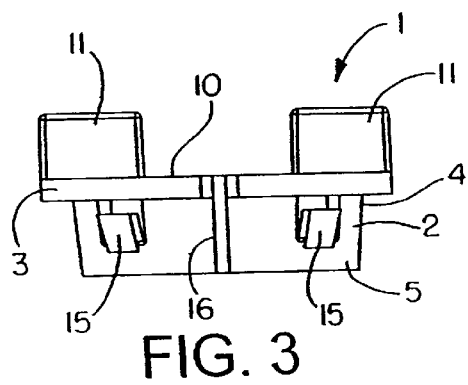
FIG. 3 is a side elevation view of the pipe clamp of FIG. 2 as seen from the plane of the line 3—3 thereof.
Figure 4:
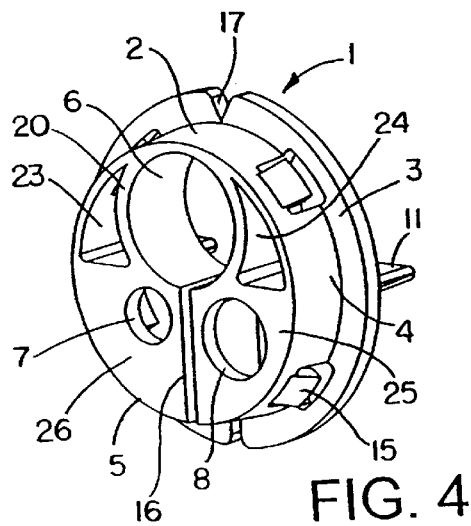
FIG. 4 is a perspective view of the pipe clamp as seen from the front end thereof.

Each pipe clamp is retained within a respective aperture in the metal wall studs as by providing a plurality of circumferentially spaced resilient locking fingers 15 on the exterior surface of the clamp body portion 2. The locking fingers 15 extend axially and radially outwardly from the body portion toward the flange 3 as shown in FIGS. 3 and 4 to allow the clamps to be inserted into the respective apertures in the metal wall studs but prevent withdrawal therefrom. Also, the ends of the locking fingers 15 closest to the flange 3 are spaced from the flange a distance slightly greater than the wall thickness of the metal wall studs in which the clamps are inserted for tightly retaining the clamps within the metal wall stud apertures.

Figure 5:
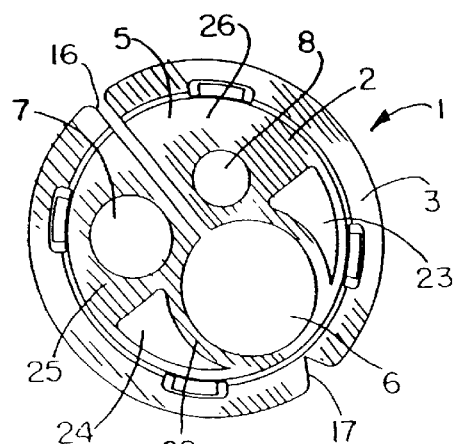
FIG. 5 is a plan view of the front side of the pipe clamp shown in FIG. 4.
Figure 6:
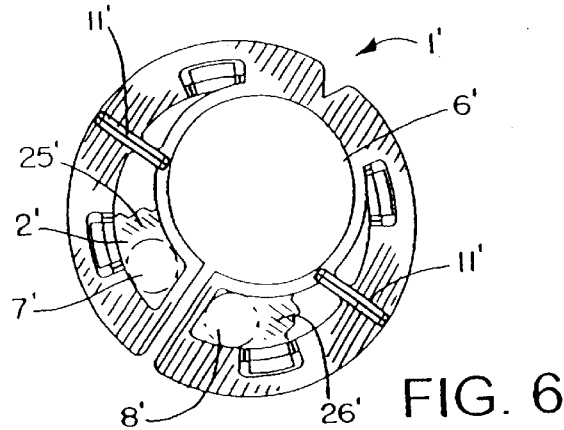
FIG. 6 is a plan view of the back side of another form of insulating pipe clamp in accordance with the present invention.

The largest diameter hole 6 through each pipe clamp 1 has a relatively thin wall thickness on one side that extends out to the exterior surface of the body portion 2 as shown in FIGS. 4 and 5. A radial slot 16 extends through the body portion 2 and flange 3 and intersects the largest diameter hole 6 directly opposite such one side. This permits the body portion of the pipe clamp 1, which may be made out of any suitable flexible plastic, to be spread apart at the slot for ease of insertion of a pipe into the largest diameter hole 6. The outer periphery of the flange 3 opposite the slot 16 has a notch 17 therein to aid in allowing the body portion 2 to be spread apart at the slot.

The wall 20 of the largest diameter hole 6 extends substantially the full length of the pipe clamp 1 (see FIGS. 1 and 4). Also, cavities 21–24 are desirably provided between the exterior wall of the largest diameter hole 6 and the exterior surface of the body portion 2 to save on plastic material from which the pipe clamps are molded. These cavities 21–24 desirably extend all the way through the body portion 2 except where the smaller diameter holes 7 and 8 are provided, transverse walls 25 and 26 containing the smaller diameter holes extend across the ends of the cavities 21 and 22. These transverse walls 25, 26 are desirably located at the end of the body portion 2 furthest from the flange 3 (see FIGS. 1 and 4), and may be of any desired thickness but should be of a minimum thickness to reduce the amount of plastic material from which the pipe clamps are molded while still providing sufficient material to support the smaller diameter pipes within the smaller diameter holes 7, 8. In like manner, the pipe clamp 1' shown in FIG. 6 may include one or more transverse walls 25' and 26' containing respective smaller diameter holes 7' and 8'.

Since the smaller diameter holes are not slotted to the exterior surface of the body portion like the largest diameter hole, the smaller diameter pipes that are accommodated in the smaller holes are threaded through the smaller diameter holes after the pipe clamps are snapped into place in the wall stud apertures and the pipe clamps are rotated to the desired orientation. If a larger diameter pipe is also accommodated in the larger diameter hole, the pipe clamp would normally be rotated to align the axis of the larger diameter hole with the axis of the larger diameter pipe rather than the axis of the smaller diameter pipes, since the smaller diameter pipes are more flexible and more easily bent or flexed to align them with the smaller diameter holes through which the smaller diameter pipes are threaded.

Sizing the larger and smaller diameter holes to closely receive correspondingly sized pipes has the advantage that the pipe clamps will support the pipes against vibration thereby substantially eliminating water hammer noise, while insulating the pipes from the metal wall studs.

Although the invention has been shown and described with respect to certain embodiments, it is obvious that equivalent alterations and modifications will occur to others skilled in the art upon the reading and understanding of the specification. In particular, with regard to the various functions performed by the above-described components, the terms (including any reference to a "means") used to describe such components are intended to correspond, unless otherwise indicated, to any component which performs the specified function of the described component (e.g., that is functionally equivalent), even though not structurally equivalent to the disclosed component which performs the function in the herein illustrated exemplary embodiments of the invention. In addition, while a particular feature of the invention may have been disclosed with respect to only one embodiment, such feature may be combined with one or more other features of other embodiments as may be desired and advantageous for any given or particular application.

What is claimed is:

1. An insulating pipe clamp for supporting a pipe within an aperture in a metal wall stud comprising an annular body portion having a radially outwardly protruding flange at one end and a plurality of circumferentially spaced different diameter holes extending axially through said body portion sized to accommodate different size pipes, the axes of said holes being offset from the axis of the body portion to permit rotation of the clamp to compensate for any misalignment between a pipe extending through one of more of the offset holes and a respective aperture in a metal wall stud in which the clamp is inserted, and a plurality of cavities in said body portion to save on material, at least one of said cavities having a transverse end wall containing a smaller diameter hole for accommodating a smaller diameter pipe, said transverse end wall having a thickness substantially less than the overall thickness of said body portion.

2. The clamp of claim 1 wherein said flange has a rearwardly facing end wall, further comprising a plurality of tabs on said end wall for grasping by an installer for ease of insertion of the clamp into a respective aperture in a metal wall stud.

3. The clamp of claim 1 wherein said flange has a rearwardly facing end wall, further comprising a plurality of tabs on said end wall for grasping by an installer for ease of rotation of the clamp within a respective aperture in a metal wall stud in which the clamp is inserted.

4. The clamp of claim 1 wherein said body portion has an exterior surface that tapers axially inwardly away from said flange to facilitate insertion of the other end of said body portion into a respective aperture in a metal wall stud.

5. The clamp of claim 4 further comprising a plurality of circumferentially spaced resilient locking fingers on said exterior surface of said body portion facing said flange that allow said other end of said body portion to be inserted into a respective aperture in a metal wall stud and prevent withdrawal therefrom.

6. The clamp of claim 5 wherein portions of said locking fingers closest to said flange are adapted to be spaced from said flange a distance slightly greater than the wall thickness of the metal wall stud in which the body portion is inserted.

7. The clamp of claim 4 wherein the largest diameter hole through said body portion has a relatively thin wall thickness on one side that extends out to the exterior surface of said body portion, and a radial slot extends through said body portion and flange and intersects the largest diameter hole opposite said one side to permit said body portion to be spread apart at said slot for ease of insertion of a pipe into the largest diameter hole.

8. The clamp of claim 7 further comprising a notch in the outer periphery of said flange opposite said slot to aid in allowing said body portion to be spread apart at said slot.

9. The clamp of claim 1 wherein a plurality of said cavities have transverse end walls containing different diameter holes for accommodating different diameter pipes.

10. The clamp of claim 1 wherein said transverse end wall is located at the end of said body portion furthest from said flange.

11. An insulating pipe clamp for supporting a pipe within an aperture in a metal wall stud comprising an annular body portion having a radially outwardly protruding flange at one end and at least one hole extending axially through said body portion for accommodating a pipe, the axis of said hole being offset from the axis of said body portion to permit rotation of said clamp to compensate for any misalignment between a pipe extending through said offset hole and a respective aperture in a metal wall stud in which the clamp is inserted, said radial flange having a rearwardly facing end wall, a plurality of tabs on said end wall for grasping by an installer, and a plurality of cavities in said body portion radially outwardly of said hole to save on material, at least one of said cavities having a transverse end wall containing a smaller diameter hole sized to accommodate a smaller diameter pipe, said transverse end wall having a thickness substantially less than the overall thickness of said body portion.

12. The clamp of claim 11 wherein said transverse end wall is located at the end of said body portion furthest from said flange.

13. The clamp of claim 11 wherein said body portion has an exterior surface that tapers axially inwardly away from said flange to facilitate insertion of the other end of said body portion into a respective aperture in a metal wall stud.

14. The clamp of claim 13 further comprising a plurality of circumferentially spaced resilient locking fingers on said exterior surface of said body portion facing said flange that allow said other end of said body portion to be inserted into a respective aperture in a metal wall stud and prevent withdrawal therefrom.

15. The clamp of claim 14 wherein portions of said locking fingers closest to said flange are adapted to be spaced from said flange a distance slightly greater than the wall thickness of the metal wall stud in which said other end of said body portion is inserted.

16. The clamp of claim 11 wherein said hole has a relatively thin wall thickness on one side that extends to the exterior surface of said body portion, and a radial slot extends through said body portion and flange and intersects said hole directly opposite said one side to permit said body portion to be spread apart at said slot for ease of insertion of a pipe into said hole.

17. The clamp of claim 16 further comprising a notch in the outer periphery of said flange opposite said slot to aid in allowing said body portion to be spread apart at said slot.

18. The clamp of claim 11 wherein a plurality of said cavities have transverse end walls containing different diameter holes sized to accommodate different diameter pipes.

* * * * *